US008462384B2

(12) United States Patent
Christie

(10) Patent No.: US 8,462,384 B2
(45) Date of Patent: Jun. 11, 2013

(54) METHODS AND APPARATUSES FOR AESTHETICALLY ENHANCED IMAGE CONVERSION

(75) Inventor: Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1176 days.

(21) Appl. No.: 10/955,762

(22) Filed: Sep. 29, 2004

(65) Prior Publication Data

US 2006/0072158 A1 Apr. 6, 2006

(51) Int. Cl.
*G06F 15/00* (2006.01)

(52) U.S. Cl.
USPC ............... 358/1.9; 358/518; 358/2.1; 347/19; 382/167

(58) Field of Classification Search
USPC ................ 358/518, 515, 501, 3.23, 539, 504, 358/530, 523–525, 1.13, 1.1, 1.14, 1.15, 358/1.9; 709/217, 224, 223, 249, 238; 700/169, 700/175, 108, 110; 347/17, 101
See application file for complete search history.

(56) References Cited

U.S. PATENT DOCUMENTS

| 4,381,890 A | 5/1983 | Wallace |
| 4,473,289 A | 9/1984 | Wallace |
| 4,605,955 A | 8/1986 | Hashimoto et al. |
| 4,811,086 A | 3/1989 | Hieda |
| 4,829,383 A | 5/1989 | Harase et al. |
| 5,016,091 A | 5/1991 | Choi |
| 5,016,094 A | 5/1991 | Kaneko |
| 5,045,928 A | 9/1991 | Takaiwa et al. |
| 5,070,407 A | 12/1991 | Wheeler et al. |
| 5,134,466 A | 7/1992 | Taek-hyun |
| 5,148,288 A | 9/1992 | Hannah |
| 5,153,717 A | 10/1992 | Nitta |

(Continued)

FOREIGN PATENT DOCUMENTS

| CN | 1313004 A | 9/2001 |
| EP | 1107176 A | 6/2001 |

(Continued)

OTHER PUBLICATIONS

PCT International Search Report and Written Opinion for PCT International Appln. No. US2005/035074, mailed Apr. 25, 2006 (19 pages).

(Continued)

*Primary Examiner* — Twyler Haskins
*Assistant Examiner* — Brendan McCommas
(74) *Attorney, Agent, or Firm* — Blakely, Sokoloff, Taylor & Zafman LLP

(57) ABSTRACT

Methods and apparatuses for automated conversion of color images to aesthetically enhanced gray scale images. In one embodiment, the mix of color channels of a color image is automatically determined as a result of analysis of the image for the generation of a gray scale image. In one example, the data of a color channel (e.g., Blue) that is not suitable for a gray scale representation is not used. The adjustment strength depends on the image itself. In one example, a stronger color channel is automatically weighted less than a weaker color channel for enhancement. In one example, after the contrast is further strengthened through nonlinear scaling, the boundary portion of the image is darkened to strengthen the edges and draw attention to the center of the image. Optionally, an attractive color balance adjustment is also made according to the gray levels to further enhance the appearance.

69 Claims, 9 Drawing Sheets

U.S. PATENT DOCUMENTS

| | | | |
|---|---|---|---|
| 5,198,890 A | 3/1993 | Suga | |
| 5,294,989 A | 3/1994 | Moore et al. | |
| 5,434,958 A | 7/1995 | Surma et al. | |
| 5,504,525 A | 4/1996 | Suzuki | |
| 5,619,260 A | 4/1997 | Miyadera | |
| 5,760,930 A | 6/1998 | Fukuzawa et al. | |
| 5,784,180 A * | 7/1998 | Sakai et al. | 358/501 |
| 5,793,883 A * | 8/1998 | Kim et al. | 382/128 |
| 5,883,973 A | 3/1999 | Pascovici et al. | |
| 5,926,218 A | 7/1999 | Smith | |
| 5,973,802 A | 10/1999 | Hirota et al. | |
| 6,038,339 A | 3/2000 | Hubel et al. | |
| 6,115,485 A * | 9/2000 | Dumoulin et al. | 382/128 |
| 6,141,033 A * | 10/2000 | Michael et al. | 348/25 |
| 6,151,410 A | 11/2000 | Kuwata et al. | |
| 6,553,135 B1 * | 4/2003 | Douglass et al. | 382/128 |
| 6,771,272 B2 | 8/2004 | Deering | |
| 6,895,112 B2 | 5/2005 | Chen et al. | |
| 6,917,720 B1 | 7/2005 | Caesar et al. | |
| 6,985,628 B2 | 1/2006 | Fan | |
| 7,006,708 B1 | 2/2006 | Nako et al. | |
| 7,057,768 B2 | 6/2006 | Zaklika et al. | |
| 7,068,840 B2 | 6/2006 | Risson | |
| 7,184,080 B2 | 2/2007 | Kehtarnavaz et al. | |
| 7,257,251 B2 * | 8/2007 | Matthews | 382/167 |
| 2002/0005855 A1 | 1/2002 | Mehigan | |
| 2002/0044215 A1 | 4/2002 | Takagi et al. | |
| 2002/0089514 A1 * | 7/2002 | Kitahara et al. | 345/600 |
| 2002/0130959 A1 | 9/2002 | McGarvey | |
| 2002/0141638 A1 * | 10/2002 | Lee et al. | 382/165 |
| 2002/0196335 A1 * | 12/2002 | Ozawa | 348/70 |
| 2003/0156752 A1 * | 8/2003 | Turpin et al. | 382/162 |
| 2003/0179926 A1 | 9/2003 | Yamazoe et al. | |
| 2003/0189579 A1 * | 10/2003 | Pope | 345/660 |
| 2004/0125215 A1 | 7/2004 | Wallace | |
| 2004/0167806 A1 * | 8/2004 | Eichhorn et al. | 705/3 |
| 2005/0085296 A1 * | 4/2005 | Gelb et al. | 463/31 |

FOREIGN PATENT DOCUMENTS

| | | |
|---|---|---|
| EP | 1289269 A | 3/2003 |
| EP | 1292112 | 3/2003 |
| EP | 1292112 A1 | 3/2003 |
| JP | H03-259664 | 11/1991 |
| JP | H05-336386 | 12/1993 |
| JP | H08-251427 | 9/1996 |
| JP | H10-063833 | 3/1998 |
| JP | 2002-027260 | 1/2002 |
| JP | 2003-179762 | 6/2003 |

OTHER PUBLICATIONS

PCT International Report on Patentability and Written Opinion for PCT/US2005/035074, mailed Apr. 12, 2007, 12 pages.

Jan Esmann, "PR Studio—Black & White—1.0—Userguide", Copyright 2003.

PCT Invitation to Pay Additional Fees for PCT/US2005/035074, mailed Feb. 13, 2006, 6 pgs.

Luminance Models for Grayscale Conversions, Garnot Hoffman.

Centre for Systems Science, Simon Fraser University, "Colour Constancy Algorithms", 10 pages, 1999.

Charles Rosenberg, "Image Color Constancy Using EM and Cached Statistics", *ICML00*, Palo Alto, CA, 8 pages, 2000.

Kobus Barnard, "Modeling Scene Illumination Colour for Computer Vision and Image Reproduction: A survey of computational approaches". Computing Science at Simon Fraser University, 39 pages, Dec. 1998.

Graham D. Finlayson, et al., "Comprehensive Colour Image Normalization", 16 pages, Jun. 1998.

Ron Gershon, et al., "From [R, G, B] to Surface Reflectance: Computing Color Constant Descriptors in Images", IJCAI, Milan, 7 pages, 1987.

Office Action mailed Mar. 28, 2011, for Japanese Patent Application No. 2007-533783, English translation of, 2 pages.

* cited by examiner

METHODS AND APPARATUSES FOR AESTHETICALLY ENHANCED IMAGE CONVERSION

FIELD OF THE INVENTION

The invention relates to image processing, and more particular to automated conversion of electronic color images.

BACKGROUND

There are situations where a color image needs to be converted into a gray scale image. Often a picture can have more impact as a black and white image. There are software programs that can automatically convert a color image into a gray scale image. One typical approach for such automated conversion averages the data of the Red, Green and Blue channels at each pixel of the color image to obtain the gray scale intensity. Other approaches evaluate a luminance measure from the color components of a color space (e.g., a Red, Green and Blue (RGB) color space) to determine the gray scale intensity. For example, the RGB values of a pixel can be used to compute the luminance component of a Hue, Saturation and Luminance (HSL) color space; the luminance component can then be used as the gray scale intensity and assigned to the RGB channels of the pixel. Such traditional methods of automated conversion typically do not generate aesthetically pleasing gray scale images.

Some software programs allow a user to choose the weight of each of the color channels for computing the gray scale intensity. After a user specifies a set of weights for different color channels, the software programs convert a color image into a gray scale image based on the user specified weights. Thus, a user may manually adjust the weight for each of the color channels to create different gray scale images for inspection and for comparison. Through manual adjustment the weights for different channels and visual inspection of the resulting gray scale images, a user can create a customized gray scale image according to the artistic taste of the user. Such an approach is suitable for users who have the time, interest, and knowledge in customizing the gray scale image. Although an experienced user may produce the desired result quickly, a typical user may find the trial-and-error process time consuming.

SUMMARY OF THE DESCRIPTION

Methods and apparatuses for automated conversion of color images to aesthetically enhanced gray scale images are described here. Some of the embodiments of the present invention are summarized in this section.

In one embodiment, the mix of color channels of a color image is automatically determined as a result of analysis of the image for the generation of a gray scale image. In one example, the data of a color channel (e.g., Blue) that is not suitable for a gray scale representation is not used. The adjustment strength depends on the image itself. In one example, a stronger color channel is automatically weighted less than a weaker color channel for enhancement. In one example, after the contrast is further strengthened through nonlinear scaling, the boundary portion of the image is darkened to strengthen the edges and draw attention to the center of the image. Optionally, an attractive color balance adjustment is also made according to the gray levels to further enhance the appearance.

In one aspect of the present invention, a method of image conversion includes: automatically generating a substantially gray scale image using data of a plurality of color channels of a color image, where a weight of a color channel (e.g., Blue) of the color image is reduced substantially and automatically in generating the substantially gray scale image. In one example, the weight for the color channel (e.g., Blue) is zero; data of the color channel of the color image (e.g., blue values of the color images) is not used in generating the substantially gray scale image. In one example, for pixels that do not have a very low luminance level, color points of the substantially gray scale image are close to a white point (e.g., on a chromaticity diagram). In one example, colors of the substantially gray scale image are a function of luminance level. In one example, weights for the plurality of color channels are determined from statistical data of the plurality of color channels. In one example of an embodiment, the plurality of color channels includes a first color channel and a second color channel; weights for the first and second channels are reverse proportional to indicators of overall color of the first and second channels of the color image. In one example, the indicators of overall color of the first and second color channels of the color image are determined based on: an average color value of the first color channel of the color image; and an average color value of the second color channel of the color image. In another example, the indicators of overall color of the first and second color channels of the color image are determined based on: a count of pixels with larger color values of the first color channel of the color image than color values of the second color channel of the color image; and a count of pixels with larger color values of the second color channel of the color image than color values of the first color channel of the color image (e.g., a count of red dominant pixels and a count of green dominant pixels).

In one example, generating the substantially gray scale image includes: scaling luminance levels to stretch a range of luminance levels; reducing luminance levels for a boundary region of the substantially gray scale image based on a distance to a boundary; and adjusting color balance according to luminance level. In one example, the scaling of the luminance levels is nonlinear with respect to luminance level. In one example, an amount of color balance shifting is reverse proportional to luminance level.

In one aspect of the present invention, a method of image conversion includes: automatically determining weights for a plurality of color channels of a color image based on statistical data of the color image; and generating a substantially gray scale image from data of the plurality of color channels of the color image according to the weights. In one example, the plurality of color channels are Red and Green; and data of Blue channel of the image is not used in generating the substantially gray scale image. In one example, the statistical data are determined from data of the plurality of color channels of the color image; and the statistical data comprises at least one of: an average of color values of one of the plurality of color channels of the color image; and a count of pixels with larger color values of a first color channel of the color image than color values of a second color channel of the color image. For example, a ratio between a weight for a first one of the plurality of color channels of the color image and a weight for a second one of the plurality of color channels of the color image is reverse proportional to a ratio between an average of color values of the first one of the plurality of color channels of the color image and an average of color values of the second one of the plurality of color channels of the color image; alternatively, a ratio between a weight for a first one of the plurality of color channels of the color image and a weight for a second one of the plurality of color channels of the color image is reverse proportional to a ratio between a count of pixels with larger color values of the first one of the plurality of color channels of the color image than color values of the second one of the plurality of color channels of the color image and a count of pixels with larger color values of the second one of the plurality of color channels of the color image than color values of the first one of the plurality of color channels of the color image. Combinations of different weights can also be used. In one example, generating the substantially gray scale image includes: determining gray levels from color values of the plurality of color channels according to the weights; scaling the gray levels to enhance contrast; reducing the gray levels for a boundary region of the substantially gray scale image based on a distance to a boundary; and determining color values of the substantially gray scale image according to the gray levels.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least one embodiment of the present invention seeks to automatically convert a color image to an aesthetically enhanced gray scale image, or a substantially gray scale image with a slight color shade based gray scale. In one embodiment, the color image is analyzed to automatically determine the strength of adjustments. In one embodiment, color channels (e.g., Red and Green) with data suitable for a gray scale representation is weighted much more heavily than a channel that has data not suitable for a gray scale representation (e.g., Blue). According to embodiments of the present invention, the color channels are automatically weighted to produce aesthetically superior results than those obtained from the traditional automated methods. Thus, an image taking system (e.g., a video camera or a still image camera) or an image processing system (e.g., a portable computer or a desktop computer) according to one embodiment of the present invention automatically generates gray scale images aesthetically similar to those manually generated by accomplished photographers.

For example, in one embodiment, the Blue channel is given a very small or zero weight in a conversion from a color image to a gray scale image, since the Blue channel data is "noisy" for a gray scale representation. If only the Blue channel data of a typical photographical is converted to a gray scale image, the resulting gray scale image is typically a high contrast image with less recognizable detail features than those observable in the original color image.

In one embodiment, the Blue channel data is not used at all in the automated generation of a gray scale image. The Red and Green channels are weighted according to statistical data about the color image to enhance the resulting gray scale image. For example, when the image is overall more Green than Red, the Red channel is weighted more than the Green channel to enhance and strengthen the detail features observable in the Red channel, which may be buried in the component from the Green channel if no enhancement is made.

Figure 1:
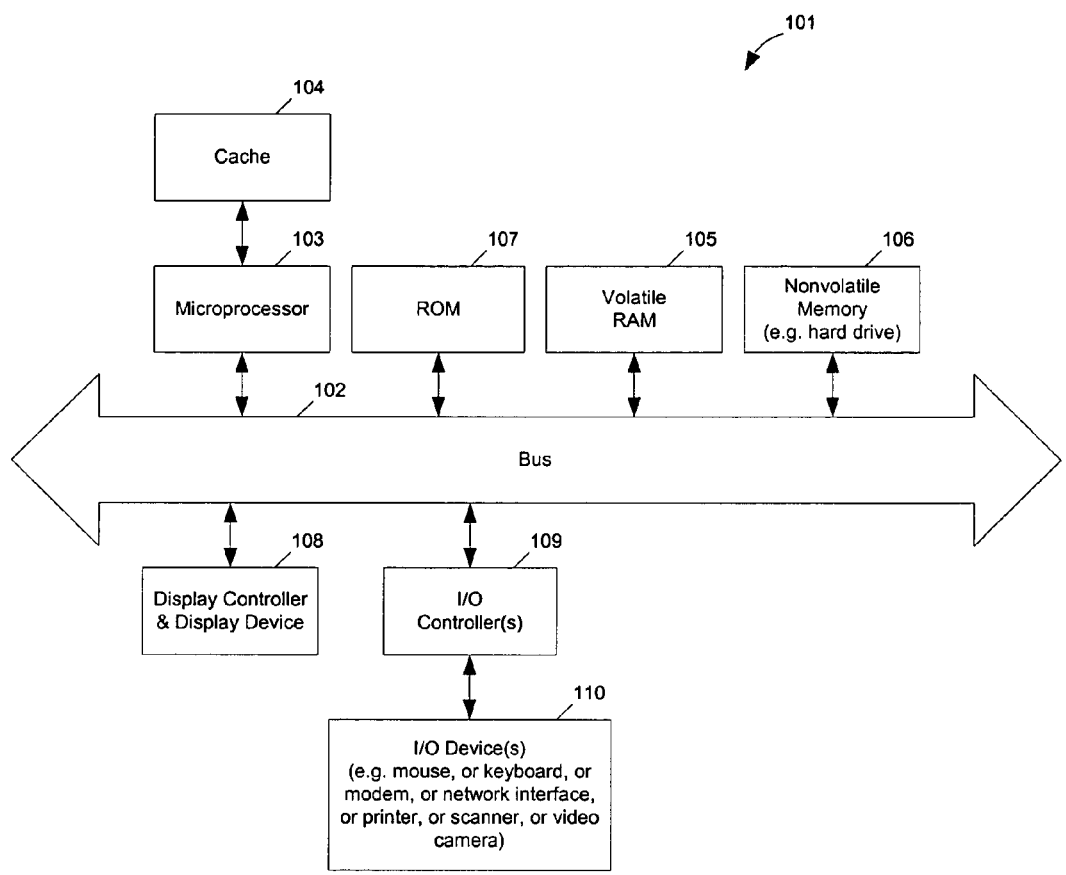
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3, G4, or G5 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 2:
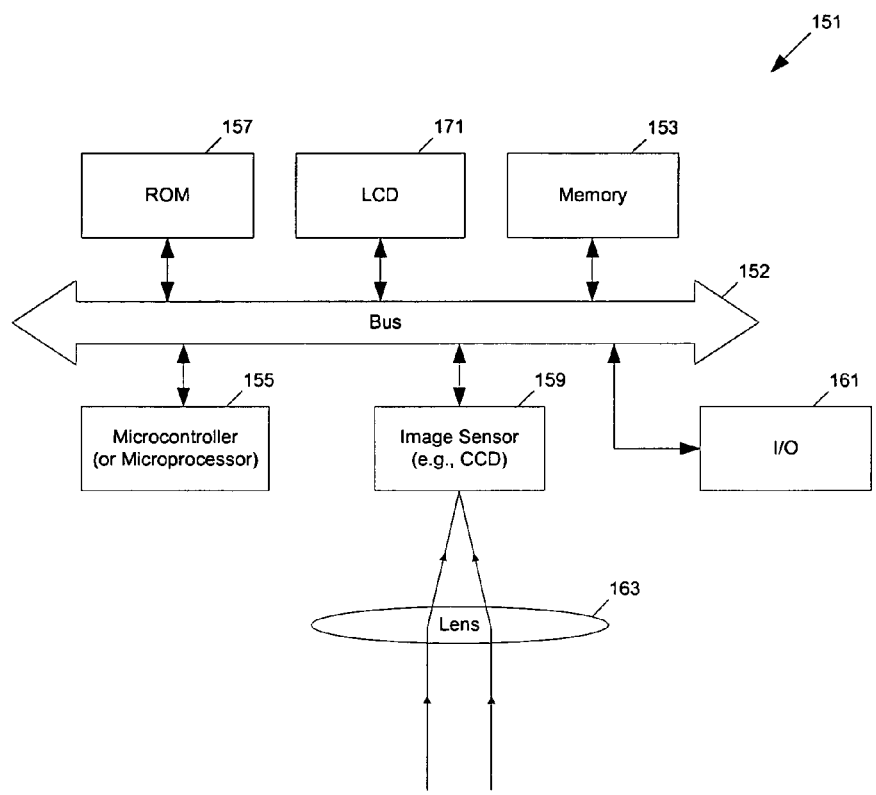
FIG. 2 shows an example of an image taking system which may be used in embodiments of the invention.

FIG. 2 shows an example of an image taking system which may be used in embodiments of the invention. This imaging device 151 may be, for example, a digital still or video (movie) camera. The imaging device 151 includes a microcontroller or microprocessor 155 which is coupled by a bus 152 to a memory 153, an Input/Output (I/O) port 161, a CCD (Charge Coupled Device) image sensor 159, and a ROM (Read Only Memory) 157. The imaging device 151 may also include a Liquid Crystal Display (LCD) 171, which is also coupled to the bus 152 and which may be used to display images which are captured or recorded by the imaging device 151. The LCD 171 serves as a viewfinder of a camera and there may optionally be other types of image display devices on imaging device 151 which can serve as a viewfinder. In one mode, the LCD display may further be used to display the user interface for setting the options for image restoration and enhancement and for displaying the transformed images. The imaging device 151 also includes an imaging lens 163 which can be disposed over CCD 159. The microprocessor 155 controls the operation of the imaging device 151; and, it may do so by executing a software program stored in ROM 157, or in the microprocessor 155, or in both ROM 157 and the microprocessor 155. The microprocessor 155 controls the image transformation operation; and, it controls the storage of a captured image in memory 153. The microprocessor 155 also controls the exporting of image data (which may or may not be color corrected) to an external general purpose computer or special purpose computer through one of the I/O ports 161. The microprocessor 155 also responds to user commands (e.g., a command to "take" a picture by capturing an image on the CCD and storing it in memory or a command to select an option for contrast enhancement and color balance adjustment). The ROM 157 may store software instructions for execution by the microprocessor 155 and may also store the options (or preferences) for performing the image conversion. The memory 153 is used to store captured/recorded images which are received from the CCD 159. It will be appreciated that other alternative architectures of a camera can be used with the various embodiments of the invention.

Figure 3:
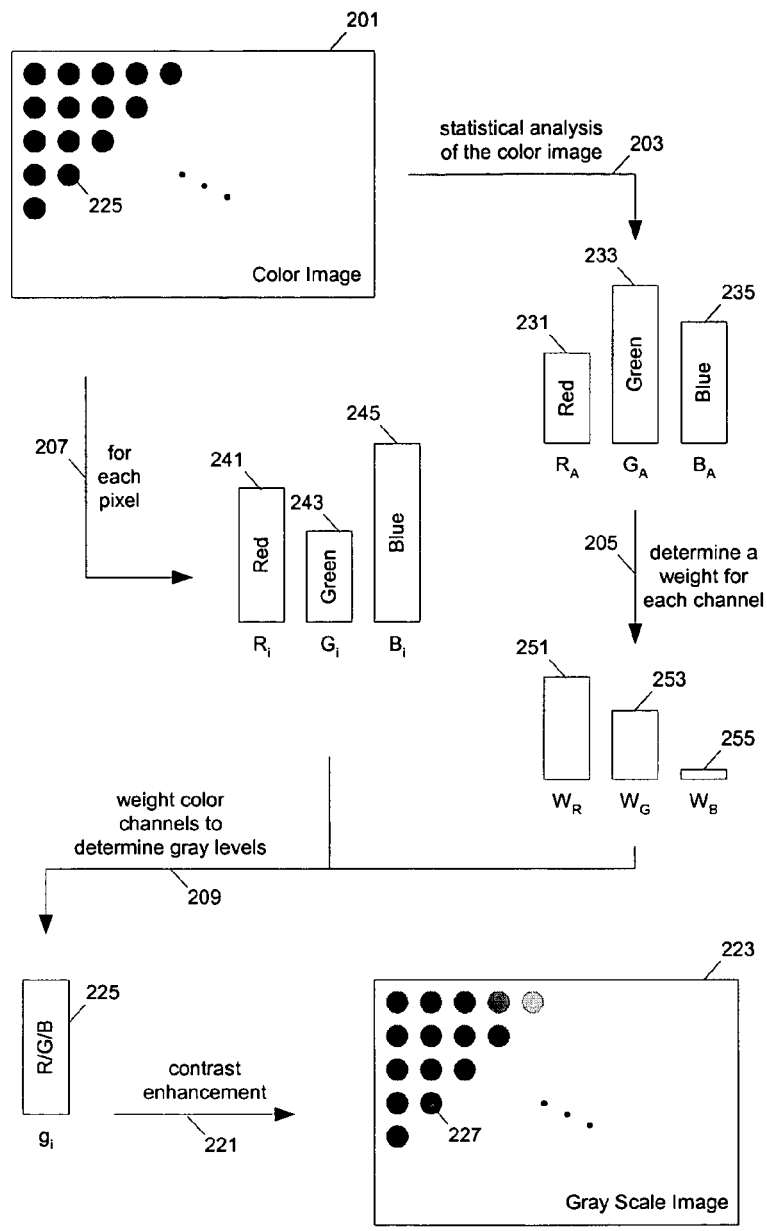
FIG. 3 shows an example of converting a color image into a gray scale image according to one embodiment of the present invention.

FIG. 3 shows an example of converting a color image into a gray scale image according to one embodiment of the present invention. In FIG. 3, color image 201 has an array of pixels. Each of the pixels of color image 201 specifies color information for a point in the color image. For example, a pixel (i) has color values Red 241 ($R_i$), Green 243 ($G_i$), and Blue 245 ($B_i$) in a Red, Green and Blue (RGB) color space. The color image (201) can be analyzed (203) to obtain statistical data about the image. For example, the average components can be determined for the color channels, Red, Green and Blue. Average Red 231 ($R_A$), average Green 233 ($G_A$) and average Blue 235 ($B_A$) can then be used to determine (205) the weight for mixing the data from the different channels.

In one embodiment, the weight $W_B$ (255) for the Blue channel is small or zero, since the data from the Blue channel of a photo image is not suitable for the generation of an aesthetically pleasing gray scale image. For the reason of simplicity, one embodiment of the present invention uses a zero weight for the Blue channel so that the data from the Blue channel is not used; it may not be necessary to evaluate the average Blue $B_A$ (235); and the averages $R_A$ (231) and $G_A$ (233) are used to determine the weights $W_R$ (251) and $W_G$ (253) for the Red and Green channels. In one embodiment, a larger weight is used for a channel that has a smaller average than the other channel so that the details in the channel with the smaller average can be enhanced and emphasized. For example, when the average $R_A$ (231) is smaller than $G_A$ (233), the Red channel has a weight $W_R$ (251) larger than $W_G$ (253).

Alternatively, the data of the Blue channel is analyzed for a determination of the weight for the Blue channel. For example, the mid-blue pixels that have non-extreme blue values (e.g., pixels without very high or very low blue values) are counted. The weight for the Blue channel increases as the percentage of the mid-blue pixels increases. A typical photo image has only a small number of mid-blue pixels so that a gray scale image generated based on only the Blue channel data provides little detailed features. If not heavily discounted, the high contrast blue channel data can bury the details of the other channels. In one embodiment, the percentages of the mid-red, mid-green and mid-blue pixels are used to determine weights so that weights are proportional (linearly or nonlinearly) to these percentages. Further, the weights based on the percentages of mid-red, mid-green and mid-blue pixels can be combined with weights based on other considerations (e.g., the Red to Green ratio) to determine the final weights for individual channels.

Once the weights for different channels are determined for the statistic analysis, the color channels are weighted to determine (209) gray levels. For example, the color values $R_i$ (241), $G_i$ (243), and $B_i$ (245) for each pixel are weighted to compute to gray level $g_i$ (225) for the corresponding pixel (e.g., $g_i = W_R \times R_i + W_G \times G_i + W_B \times B_i$). In one embodiment, the Blue channel data is not used (e.g., $W_B = 0$) such that $g_i = W_R \times R_i + W_G \times G_i$. In one embodiment, the gray scale image is represented in the RGB space; and the value of the gray level $g_i$ is equally assigned to the Red, Green and Blue channels of the gray scale image. The contrast can be then optionally enhanced (221) for the generation of the gray scale image 223.

Figure 4:
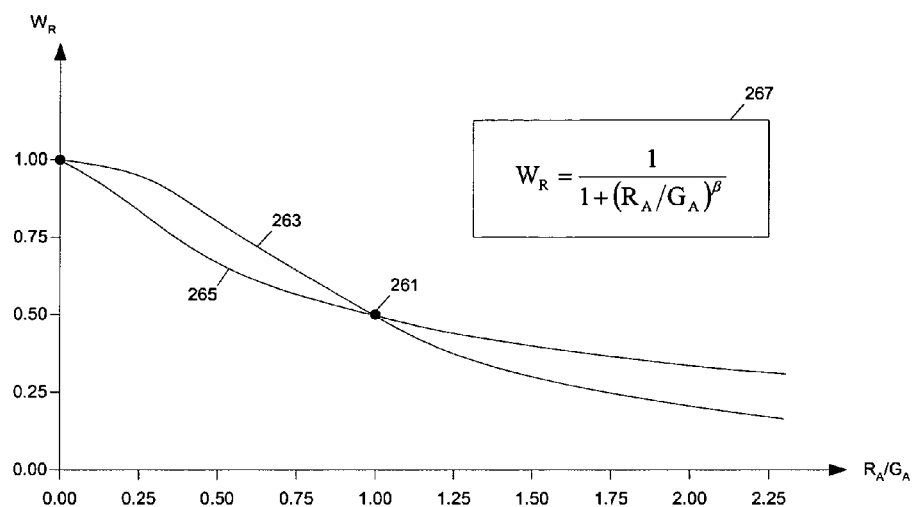
FIG. 4 shows an example of determining a weight for a color channel according to one embodiment of the present invention.

FIG. 4 shows an example of determining a weight for a color channel according to one embodiment of the present invention. In one embodiment of the present invention, the weight for the Blue channel is zero ($W_B$); and the weight for the Red and Blue channels are computed according to the following expression.

$$W_R = G_A^\beta / (G_A^\beta + R_A^\beta) = 1/[1+(R_A/G_A)^\beta]$$

$$W_G = R_A^\beta / (R_A^\beta + G_A^\beta) = 1/[1+(G_A/R_A)^\beta]$$

Thus, the weights for the Red and Green channels are reverse proportional, linearly or nonlinearly, to the average color values of the Red and Green channels (e.g., $W_R/W_G = (G_A/R_A)^\beta$). In the above example, $W_R + W_G = W_R + W_G + W_B = 1$. The gray level for a pixel, originally having color values ($R_i$, $G_i$, $B_i$), is determined according to: $g_i = R_i/(1+\lambda^\beta) + G_i/(1+\lambda^{-\beta})$ where $\lambda = R_A/G_A$.

The adjustable parameter $\beta$ specifies how sensitive the adjustments are to changes in the Red to Green ratio ($R_A/G_A$). At point 261 of FIG. 4, the average Green is equal to the average Red (e.g., $R_A/G_A = G_A/R_A = 1$). Thus, the weights for the Red and Green channels are equal to each other (e.g., $W_R = W_G = \frac{1}{2}$) at point 261. When the Red to Green ratio moves away from point 261, the difference between the average Red and the average Green becomes bigger; and the difference between the weights for the different channels also becomes bigger. When $\beta = 1$, curve 265 shows that weight $W_R$ changes gradually as the different between the average Red and the average Green becomes bigger. When $\beta = 2$, curve 263 shows that weight $W_R$ changes more rapidly as the different between the average Red and the average Green becomes bigger. One implementation uses $\beta = 2$, although other values (e.g., 1, 1.5 or 3) can also be used.

The weights $W_R$ and $W_G$ can be computed from an analytical expression as illustrated above. Alternatively, the weight as a function of the Red to Green ratio (e.g., $R_A/G_A$) can also be determined from a look up table or from an interpolation (e.g., piecewise linear or polynomial interpolation) based on a look up table. The look up table or an analytical expression can be derived from curve fitting the results created by one or more accomplished photographers. For example, after a number of different photo images are manually converted into aesthetically pleasing gray scale images, the resulting gray scale images can be compared to the original images to determine the weights $W_R$ and $W_G$ as the function of the Red to Green ratio (e.g., $R_A/G_A$).

The above example illustrates a simple and effective embodiment where the Blue channel is discarded and the weights for the Red and Green channels are determined as a function of the Red to Green ratio (e.g., $R_A/G_A$). From this description, a person skilled in the art will understand that in general, the weights for the color channels can be derived from various statistical data (such as averages, standard deviations, distribution of different values in a color channel, and others) can be used to compute the weights. Further different indicators of the Red to Green ratio can be used. For example, each pixel may be examined to determine whether the pixel is reddish or greenish based on its Red and Green components. When $R_i > G_i$, the pixel is reddish; and when $R_i < G_i$, the pixel is greenish. The number of reddish pixels ($N_R$) and the number of greenish pixels ($N_G$) can be counted for the determination of the weights for the Red and Green channels.

For example, the weights for the Red and Green channels can be alternatively determined using the following expressing.

$$W_R = N_G^\beta / (N_G^\beta + N_R^\beta) = 1/[1+(N_R/N_G)^\beta]$$

$$W_G = N_R^\beta / (N_R^\beta + N_G^\beta) = 1/[1+(N_G/N_R)^\beta]$$

Further, the number of reddish pixels ($N_R$), the number of greenish pixels ($N_G$), the average Red ($R_A$), and the average Green ($G_A$) can be used together to determine the weights. For example, $$W_R = (G_A N_G)^\beta / ((G_A N_G)^\beta + (R_A N_R)^\beta) = 1[1+((R_A N_R)/(G_A N_G))^\beta)]$$

$$W_G = (R_A N_R)^\beta / ((R_A N_R)^\beta + (G_A N_G)^\beta) = 1[1+((G_A N_G)/(R_A N_R))^\beta]$$

Alternatively, ($N_G/N_R$) and ($R_A/G_A$) may have different exponents. For example, $$W_R = G_A^\gamma N_G^\beta / (G_A^\gamma N_G^\beta + R_A^\gamma N_R^\beta) = 1/[1+(R_A/G_A)^\gamma \times (N_R/N_G)^\beta]$$

$$W_G = R_A^\gamma N_R^\beta / (R_A^\gamma N_R^\beta + G_A^\gamma N_G^\beta) = 1/[1+(G_A/R_A)^\gamma \times (N_G/N_R)^\beta]$$

A more sophisticated embodiment uses the parameters of the statistical data to curve fit the results generated by designers or accomplished photographers. Further, different photographers may create gray scale images in different styles; and the weights for the different styles can be generated accordingly. Thus, once a user selects a style, aesthetically pleasing gray scale images according to the selected style can be generated automatically without further efforts from the user.

In the above example, the Red to Green ratio (e.g., $R_A/G_A$, $N_R/N_G$, or a combination of $R_A/G_A$ and $N_R/N_G$) is computed based on the averages of the entire image. However, the Red to Green ratio can also be computed based on an area of interest, such as a center region of the image. Objects of interests are typically located in the center portion of a photo image. Thus, the averages of the Red and Green channels of the center portions can be used to determine the weights for mixing the channels to produce pleasing results for the objects of interest.

Although the above examples are illustrated using pixel representation of digital images in RGB color space, the methods of embodiments of the present invention can also be applied to other image formats in other color spaces. For example, the image may be defined as analog signals on a number scan lines. The weights for the Red, Green and Blue channels can also be converted into weights for other color components in other color spaces.

Further, in one embodiment, the range of the luminance level is adjusted (e.g., to an maximum allowable range) to enhance the darkness, brightness and contrast. For example, when the maximum luminance and minimum luminance of the gray levels are: $L_{max} = \text{Max}(g_i$ for all i) and $L_{min} = \text{Min}(g_i$ for all i) and when the maximum allowable range is [0,1] for the gray level, the gray level can be scaled linearly according to:

$$g_i' = (g_i - L_{min})/(L_{max} - L_{min})$$

Alternatively, the gray level is scaled back to have the original luminance range of the original color image.

Figure 5:
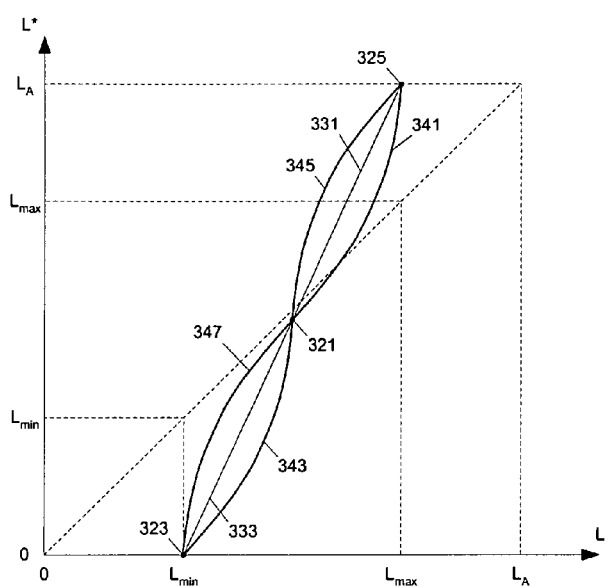
FIG. 5 shows examples of stretching the luminance range of an image according to one embodiment of the present invention.

FIG. 5 shows examples of stretching the luminance range of an image according to one embodiment of the present invention. A curve in FIG. 5 maps from an input luminance L to a target luminance L*. In one embodiment of the present invention, the luminance level is linear stretched (e.g., according to line segments 331 and 333). Alternatively, non-linear scaling is used in one embodiment of the present invention to enhance contrast. For example, curve 343 can be used for the darker portion (e.g., between points 321 and 323); and, the light portion (e.g., between points 321 and 325) may be scaled linearly using line segment 331, or nonlinearly using curve 345 or 341. In one embodiment, a nonlinear curve 343 is below the lines 333 and 331 in the low luminance region and a nonlinear curve 345 is above the lines 333 and 331 in the high luminance region; in another embodiment, a nonlinear curve for contrast enhancement is above the line for linear transformation in the low luminance region and below the line for linear transformation in the high luminance region (e.g., curves 347 and 341).

Figure 6:
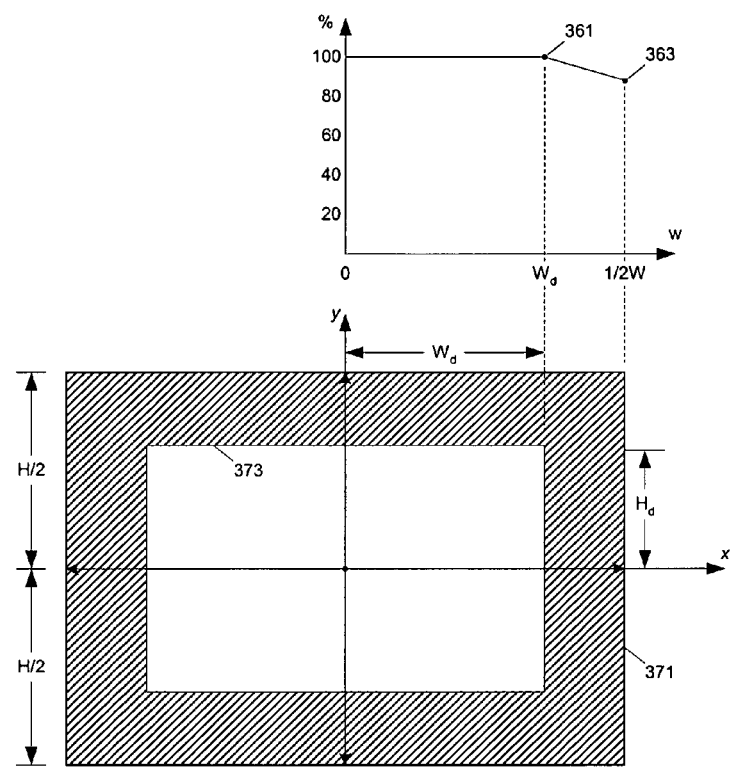
FIG. 6 shows an example of edge darkening according to one embodiment of the present invention.

In one embodiment of the present invention, to enhance the appearance of the image, the boundary portion of the image is darkened. FIG. 6 shows an example of edge darkening according to one embodiment of the present invention. In FIG. 6, the luminance of the boundary region (e.g., the portion outside region 373) is reduced by a percentage according to the distance to the center. For example, in one embodiment of the present invention, when the position of the pixel is between [$W_d$, ½ W], where W is the width of the image and $W_d$ is a selected position, the signal level for each of the color channels of the pixel is reduced by a percentage indicated by the line segment between points 361 and 363.

For example, the edge darkening can be performed according to:

$$g_i'' = g_i' \times f_x(x) \times f_y(y)$$

$$f_x(x) = \text{Max}([1 - 0.12 \times (|x| - W_d)/(W/2 - W_d)], 1)$$

$$g(y) = \text{Max}([1 - 0.12 \times (|y| - H_d)/(H/2 - H_d)], 1)$$

where x is in [−W/2, W/2] and y in [−H/2, H/2]; and H is the height of the image. For example, $W_d$ can be ⅜ W so that the boundary portion of a width of W/8 is darkened on the left and on the right. Similarly, $H_d$ can be ⅜H so that the boundary portion of a height of H/8 is darkened on the top and on the bottom.

In one embodiment of the present invention, the amount of edge darkening is small so that the darkening may not consciously noticeable. However, the edge darkening strengthens the edges and draw attention to the center of the image.

Although the above example shows a linear scaling in the boundary area in each direction for edge darkening, it is understood that non-linear scaling can also be used. Further, different shapes and areas for defining the boundary area for darkening can also be used. Further, it is understood that edge darkening is optional; and, some embodiments of the present invention do not include edge darkening.

Further, in one embodiment, an attractive color balance adjustment is performed so that the gray scale image is substantially gray with a color tone. The color balance is adjusted so that the resulting image is not exactly on a white point. A gray scale image is perfectly white balanced; and the color points of the gray scale image are on a white point (e.g., on a chromaticity diagram). In one embodiment, the substantially gray scale image has color points very close to the white point for pixels that do not have a very low luminance level. In one embodiment, the colors of the substantially gray scale image are a function of luminance level. For example, assuming that the RGB components and gray scale $g_i''$ are defined with the range [0,1], the RGB components of a converted image have the following values.

$$R_i' = k_0[g_i'' + k_1(1 - g_i'')^q]$$

$$G_i' = k_0[g_i'' + k_2(1 - g_i'')^q]$$

$$B_i' = k_0[g_i'' + k_3(1 - g_i'')^q]$$

Different $k_1$, $k_2$ and $k_3$ values are used to move the color off balance way from white. For example, $k_1$ (e.g., 0.04) causes the color shifting toward Red; $k_2$ (e.g., 0.01) causes the color shifting toward Green; $k_3$ (e.g., 0.04) causes the color shifting toward Blue. In one embodiment, $k_2$ is zero. The color shifting is a function of the gray level. The factor $(1-g_i'')^q (q>0)$ causes the color shifting to be reverse proportional to the gray level. In one embodiment, exponent q is larger than zero such that the brighter the pixel, the smaller the shift. In one example, q=1 so that the variation is a linear function of the gray level. Alternatively, q may be zero so that the same amount of shifting is applied to all pixels. Alternatively, q may be larger than 1 (e.g., 2) or smaller than 1 (e.g., 0.5).

In the above example, $k_0$ can be chosen as $3 g_i''/[3 g_i'' + (k_1 + k_2 + k_3) \times (1 - g_i'')^q]$ so that the average of RGB components remains at $g_i''$. In one example, q=1; $k_2$=0; $k_3$=2 $k_1$; $k_0 = g_i''/[g_i'' + k_1 \times (1 - g_i'')]$; and, the magnitude of $k_1$ controls the overall color balance shifting. Alternatively, if $k_0$=1, the black ($g_i''$=0) will have the RGB values ($k_1$, $k_2$, $k_3$), which is not exactly black.

From this description, a person skilled in the art will understand that the color balance adjustments can be made in different styles and using different methods. For example, customized color balance adjustments produced by designers can be curved fitted or coded as a look up table.

Figure 7:
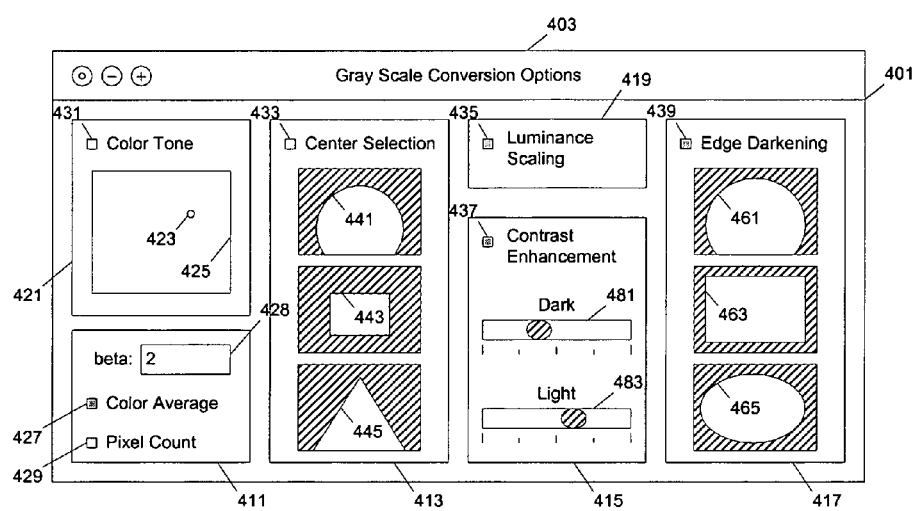
FIG. 7 shows an example user interface for adjusting parameters for transforming an image according to one embodiment of the present invention.

FIG. 7 shows an example user interface for adjusting parameters for transforming an image according to one embodiment of the present invention. In FIG. 7, window 401 shows a graphical user interface that may be implemented in a computer system for the selection of parameters that controls the transformation of image. For example, window 401 has a title bar 403 and panels (or frames) 411-421 for different types of options. Check buttons 431, 433, 435, 437 and 439 can be used to selectively enable the respective options in the panels.

Panel 411 allows a user to specify the parameters for computing the weights. For example, when the weights for the color channels are determined by $$W_R = 1/\{1 + [(R_A/G_A) \times (N_R/N_G)]^\beta\}$$

$$W_G = 1/\{1 + [(G_A/R_A) \times (N_G/N_R)]^\beta\}$$

$$W_B = 0$$

the parameter β can be specified in entry box 428. The user may choose to determine the Red to Green ratio based on the average color value (e.g., $R_A$ and $G_A$), the pixel count (e.g., $N_R$ and $N_G$) or both. For example, when box 427 is checked, $R_A$ and $G_A$ are computed for the computation of $W_R$ and $W_G$; when box 427 is not checked, it is assumed that $R_A = G_A$ ($R_A$ and $G_A$ are not computed). Similarly, when box 429 is checked, $N_R$ and $N_G$ are computed for the computation of $W_R$ and $W_G$; when box 429 is not checked, it is assumed that $N_R=N_G$ ($N_R$ and $N_G$ are not computed).

In general, different ways to compute weights based on the statistical data of the images require different parameters and thus different user interfaces. Since adjusting the parameters for the determination of the weights for mixing the color channels requires time and experiences, default values can be provided so that a typical user does not have to make any adjustment. Alternatively, a limited number of pre-designed combinations may be provided as a list of options so that the user can easily select one from the list.

Panel 413 allows a user to select the definitions of the center portion for the color ratio determination. When box 433 is not checked, the parameters for the determination of the Red to Green ratio (e.g., $R_A$, $G_A$, $N_R$ and $N_G$) are computed based on the entire color image. When box 433 is checked, the parameters for the determination of the Red to Green ratio (e.g., $R_A$, $G_A$, $N_R$ and $N_G$) are computed based on the center portion of the color image. A number of predefined configurations can be presented as radio button icons (e.g., 441-445), such that a user can simply choose from one of them. Alternatively, the icons may further bring a window for the specification of the sizes and positions of the different regions. Furthermore, a drawing window may allow a user to draw the center portion (e.g., through receiving input from an input device which represent drawing actions and displaying the feedback of the received input interactively to show the result of the interpreted drawing actions).

Panel 419 allows a user to select whether or not to stretch the luminance range. When box 435 is checked, the luminance of the gray scale image is scaled to the maximum possible range. Alternatively, an interface (not show in FIG. 7) may allow the user to specify the target range of the luminance if the user chooses to stretch the luminance range.

Panel 415 allows the user to select the different types of scaling for the dark portion of the luminance range and the light portion of the luminance range. For example, when the scale (e.g., 481 or 483) is in the center, a linear scaling is used; when the scale is move to the left, a nonlinear scaling is according to a curve with a shape similar to that of curve 345 in FIG. 5; and when the scale is move to the right, a nonlinear scaling is according to a curve with a shape similar to that of curve 341 in FIG. 5. The scale controls the curvature of the luminance-scaling curve.

Panel 417 allows a user to select whether or not to darken the boundary region. When box 439 is checked, edge darkening is applied. Radio icon buttons (e.g., 461-465) can be used to select a definition of the boundary region. Alternatively, similar to the buttons for the selection of the center region, the radio buttons 461-465 may further bring windows for the specification of the dimensions and positions of predefined shapes of boundary regions. Furthermore, a user interface may allow the user to draw a shape to define the boundary regions.

Panel 421 allows a user to specify the color tone (e.g., $\{k_1, k_2, k_3\}$). When box 431 is not checked, a gray scale image is generated without color balance adjustment. When box 431 is check, the gray scale image is adjusted to have a color tone. For example, a user may use a cursor-controlling device (e.g., a mouse, a touch pad, or a track ball, or others) to move a circle (423) to select a particular color $\{R_t, G_t, B_t\}$ from a continuous color palette (425). For example, the parameters $\{k_1, k_2, k_3\}$ are then determined from $\{R_t, G_t, B_t\}$ (e.g., $k_1=0.1 R_t$, $k_2=0.1 G_t$, $k_3=0.1 B_t$) so that the color components are determined from the gray level g using the following expression:

$$R=k_0[g+k_1(1-g)]$$

$$G=k_0[g+k_2(1-g)]$$

$$B=k_0[g+k_3(1-g)]$$

where $k_0=3g/[3g+(k_1+k_2+k_3)\times(1-g)]$.

Alternatively, any other methods known in the art for selecting a color can be used.

Although the human interface is illustrated with an example in FIG. 7, from this description, one skilled in the art understands that various different types of user interfaces may be used for different types of data processing system, such as computers, palm top computers, still cameras, video cameras, and others. It is understood that different types of systems typically use different types of user interface elements (e.g., graphical user interface based, text based, icon based) and may offer different levels of details for the specification of options. Various types of user interface techniques known in the art can be used for the specification of the options of the present invention. Further, the user interface may present the resulting image interactively such that a user can observes the effects of changing options interactively.

In one embodiment of the present invention, a set of pre-designed parameters is provided as default values for the image conversion. The data processing system (e.g., a still camera or a computer connected to a video camera for video conferencing) can be used to automatically convert the color images to a gray scale image or a substantially gray scale image based on the analysis of the color images. In one embodiment, a user is provided with an interface to adjust at least some of the parameters to create a set of user customized parameters. For example, a user may be presented with a user interface (e.g., as show in FIG. 7) to directly specify the customized parameters; alternatively, the user may be presented with a number of sample images for customization (e.g., using a traditional software programs for customizing a photo image), the results of which are then used to derive the parameters. Once the parameters are properly configured, color images are automatically converted to gray scale images without further user adjustments. For example, a user may choose to convert the color images of a video camera for video conference to gray scale images; the video images can be automatically converted to aesthetically enhanced gray scale images in real time.

Figure 8:
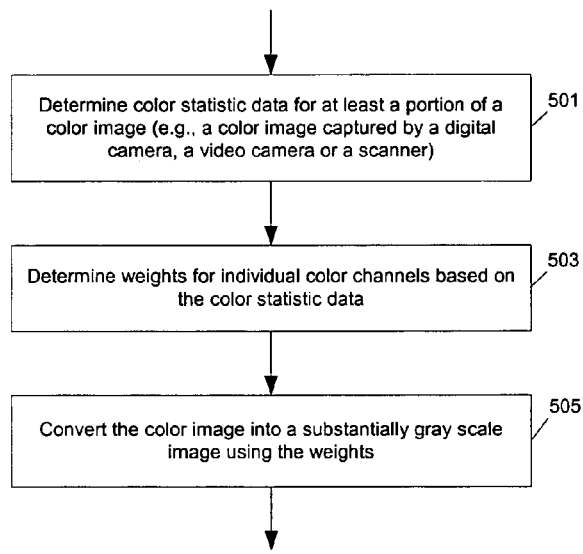
FIG. 8 shows a flow chart of a method to perform image conversion according to one embodiment of the present invention.

FIG. 8 shows a flow chart of a method to perform image conversion according to one embodiment of the present invention. After operation 501 determines color statistic data for at least a portion of a color image (e.g., a color image captured by a digital camera, a video camera or a scanner), operation 503 automatically determines weights for individual color channels based on the color statistic data. Then, operation 505 converts the color image into a substantially gray scale image using the weights.

Figure 9:
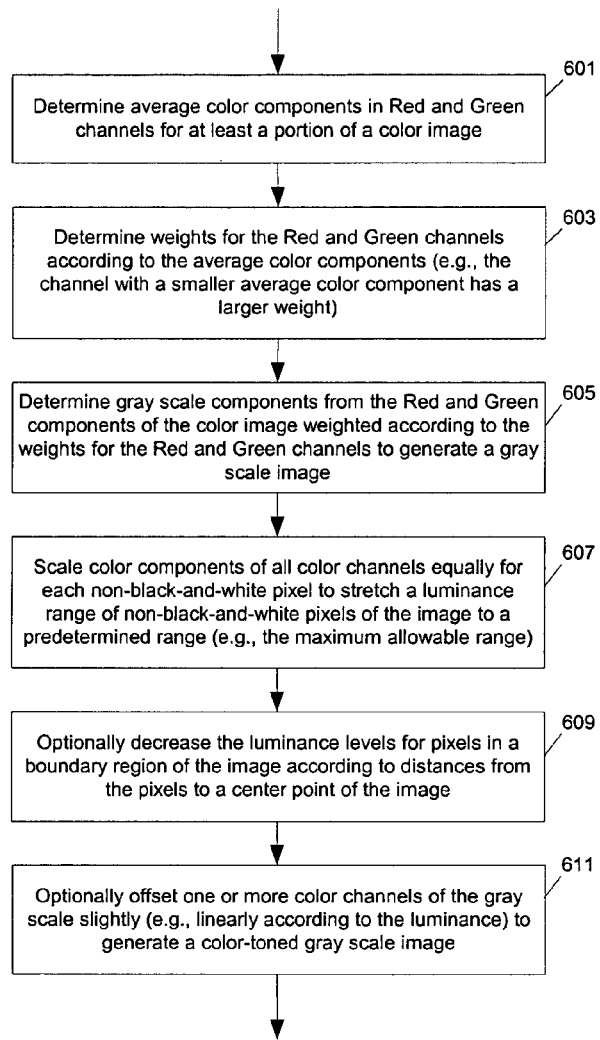
FIG. 9 shows a detailed method to transform an image according to one embodiment of the present invention.

FIG. 9 shows a detailed method to transform an image according to one embodiment of the present invention. Operation 601 determines average color components in Red and Green channels for at least a portion of a color image. Operation 603 determines weights for the Red and Green channels according to the average color components (e.g., the channel with a smaller average color component has a larger weight). Operation 605 determines gray scale components from the Red and Green components of the color image weighted according to the weights for the Red and Green channels to generate a gray scale image. Operation 607 scales color components of all color channels equally for each non-black-and-white pixel to stretch a luminance range of non-black-and-white pixels of the image to a predetermined range (e.g., the maximum allowable range). Operation 609 optionally decreases the luminance levels for pixels in a boundary region of the image according to distances from the pixels to a center point of the image. Operation 611 optionally offsets one or more color channels of the gray scale slightly (e.g., linearly according to the luminance) to generate a color-toned gray scale image.

The foregoing description of the methods in FIGS. 8 and 9 assumes a particular process flow in which certain operations or actions follow other operations or actions. It will be appreciated that alternative flows may also be practiced with the present invention. Other alternative sequences of operations may be envisioned by those skilled in the art. Further, some of the operations can be performed in parallel. For example, the scaling for color restoration in individual color channels can be performed in parallel; and, the transformation for pixels or blocks of pixels can be performed in parallel, once the averages are obtained. While examples of the invention have involved the use of the RGB color space, embodiments of the invention may use other color spaces such as other tristimulus spaces or CMYK, etc.

The methods according to various embodiments of the present invention are simple and computationally efficient. Real time transformation can be performed on images of megapixels (or larger sizes) with consumer level computing resources. Thus, methods of the present application can be incorporated into image capturing devices not only for still images but also for video (or streaming) images. In a two-way video product, the methods of the present invention can be used to convert the outbound images as well as the inbound images. The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as system 151 in FIG. 2. The methods of the present invention can also be implemented as computer instructions for execution on a data processing system, such as system 101 of FIG. 1.

In one embodiment of the present invention, methods of the present inventions are implemented in video applications (e.g., implemented as a software module in video conference application programs, implemented as hardware circuits in video capturing devices, such as video cameras for computer or hand-held devices, for video monitoring, or for other video applications). It may be desirable to convert the color image to a substantially gray scale image that is aesthetically pleasing, clearly displaying the details in the image (e.g., the objects in the center portion of the image) for viewing and for the recognition of details. For example, in a video conference, it may typically be expected that the face of the person in the conversation is in the center of the image. The image will be pleasing if the color tone of the face is properly represented in the gray scale image with great details regardless of the color and intensity of the background light and environment condition.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine readable medium containing executable computer program instructions which when executed by a data processing system cause said system to perform a method of image conversion, the method comprising:
   receiving a plurality of settings via a user interface for the image conversion to convert a color image to a substantially gray scale image, the settings configuring the image conversion by selecting one or more statistical measures from a set of predetermined statistical measures, the color image having a plurality of color channels, each statistical measure applicable for generating statistical data from each color channel of the color image;
   evaluating the selected statistical measures for each color channel to determine a plurality of parameters from the color image for converting pixels of the color image to pixels of the substantially gray scale image, each parameter corresponding to statistical data generated via one of the selected statistical measures of one color channel of the color image, wherein the plurality of parameters for converting the pixels of the color image are independent of locations of the pixels in the color image;
   determining weights for the plurality of color channels of the color image based on the determined parameters, each weight depending on a subset of the plurality of parameters; and
   automatically generating the pixels of the substantially gray scale image using weighted color values of the color image according to the weights of the plurality of color channels.

2. The medium of claim 1, wherein each weight has a non zero value, wherein one of the weights of the plurality of color channels of the color image is substantially smaller compared with a remainder of the weights of the plurality of color channels in generating the substantially gray scale image and wherein color channel corresponding to the one of the weights is Blue.

3. The medium of claim 2, wherein data of a color channel of the color image is not used in generating the substantially gray scale image.

4. The medium of claim 2, wherein the substantially gray scale image is a gray scale image.

5. The medium of claim 2, wherein, for pixels that do not have a very low luminance level, color points of the substantially gray scale image are close to a white point.

6. The medium of claim 2, wherein colors of the substantially gray scale image are a function of luminance level.

7. The medium of claim 1, wherein the plurality of parameters are determined from statistical data of the plurality of color channels.

8. The medium of claim 1, wherein the plurality of color channels comprises a first color channel and a second color channel, wherein the plurality of parameters include a first parameter and a second parameter, wherein weights for the first and second channels are reverse proportional to the first and second parameters, and wherein the first and second parameters indicate overall color of the first and second channels of the color image.

9. The medium of claim 8, wherein the first and second parameters are determined based on:
   an average color value of the first color channel of the color image; and
   an average color value of the second color channel of the color image.

10. The medium of claim 8, wherein the first and second parameters are determined based on:
- a count of pixels with larger color values of the first color channel of the color image than color values of the second color channel of the color image; and
- a count of pixels with larger color values of the second color channel of the color image than color values of the first color channel of the color image.

11. The medium of claim 1, wherein said generating the substantially gray scale image comprises:
- scaling luminance levels to stretch a range of luminance levels.

12. The medium of claim 11, wherein said scaling is non-linear with respect to luminance level.

13. The medium of claim 1, wherein said generating the substantially gray scale image comprises:
- reducing luminance levels for a boundary region of the substantially gray scale image based on a distance to a boundary.

14. The medium of claim 1, wherein said generating the substantially gray scale image comprises:
- adjusting color balance according to luminance level.

15. The medium of claim 14, wherein an amount of color balance shifting is reverse proportional to luminance level.

16. A machine readable medium containing executable computer program instructions which when executed by a data processing system cause said system to perform a method of image conversion, the method comprising:
- receiving a plurality of settings via a user interface for the image conversion to convert a color image to a substantially gray scale image, the settings configuring the image conversion by selecting one or more statistical measures from a set of predetermined statistical measures, the color image having a plurality of color channels, each statistical measure applicable for generating statistical data from each color channel of the color image;
- evaluating the selected statistical measures for each color channel to determine a plurality of parameters from the color image for converting pixels of the color image to pixels of the substantially gray scale image, each parameter corresponding to statistical data generated via one of the selected statistical measures of one color channel of the color image, at least one of the plurality of parameters corresponding to a statistical data of the color image, wherein of the plurality parameters for converting the pixels of the color image are independent of locations of the pixels in the color image;
- automatically determining weights for the plurality of color channels of the color image based on the determined parameters, each weight depending on a subset of the plurality of parameters; and
- generating the pixels of the substantially gray scale image from weighted color values of the color image according to the weights, each weight having a non-zero value, wherein one of the weights for the plurality of color channels is substantially smaller compared with a remainder of the weights of the plurality of color channels.

17. The medium of claim 16, wherein the plurality of color channels include Red and Green; and wherein the one of weights corresponds to Blue channel of the image in generating the substantially gray scale image.

18. The medium of claim 17, wherein the determination of the plurality of parameters comprises:
- determining the statistical data from data of the plurality of color channels of the color image.

19. The medium of claim 16, wherein the statistical data comprises one of:
- an average of color values of one of the plurality of color channels of the color image; and
- a count of pixels with larger color values of a first color channel of the color image than color values of a second color channel of the color image.

20. The medium of claim 16, wherein a ratio between a weight for a first one of the plurality of color channels of the color image and a weight for a second one of the plurality of color channels of the color image is reverse proportional to a ratio between an average of color values of the first one of the plurality of color channels of the color image and an average of color values of the second one of the plurality of color channels of the color image.

21. The medium of claim 16, wherein a ratio between a weight for a first one of the plurality of color channels of the color image and a weight for a second one of the plurality of color channels of the color image is reverse proportional to a ratio between a count of pixels with larger color values of the first one of the plurality of color channels of the color image than color values of the second one of the plurality of color channels of the color image and a count of pixels with larger color values of the second one of the plurality of color channels of the color image than color values of the first one of the plurality of color channels of the color image.

22. The medium of claim 16, wherein said generating the substantially gray scale image comprises:
- determining gray levels from color values of the plurality of color channels according to the weights;
- scaling the gray levels to enhance contrast;
- reducing the gray levels for a boundary region of the substantially gray scale image based on a distance to a boundary; and
- determining color values of the substantially gray scale image according to the gray levels.

23. An imaging device, comprising:
- an image sensor to generate color values of a color image;
- a processing circuit coupled to the image sensor, the processing circuit configured to:
  - receive a plurality of settings via a user interface for image conversion to convert the color image to a substantially gray scale image, the settings configuring the image conversion by selecting one or more statistical measures from a set of predetermined statistical measures, the color image having a plurality of color channels, each statistical measure applicable for generating statistical data from each color channel of the color image,
  - evaluate the selected statistical measures for each color channel to determine a plurality of parameters from the color image for converting pixels of the color image to pixels of the substantially gray scale image, each parameter corresponding to statistical data generated via one of the selected statistical measures of one color channel of the color image, wherein the plurality of parameters for converting the pixels of the color image are independent of locations of the pixels in the color image,
  - determine weights for the plurality of color channels of the color image based on the parameters, each weight depending on a subset of the plurality of parameters, and
  - generate the pixels of the substantially gray scale image using weighted color values of the color image according to the weights of the plurality of color channels of the color image.

24. The imaging device of claim 23, where in each weight has a non zero value, wherein one of the weights of the plurality of color channels of the color image is substantially smaller compared with a remainder of the weights of the plurality of color channels in generating the substantially gray scale image and wherein color channel corresponding to the one of the weights is Blue.

25. The imaging device of claim 24, wherein data of a color channel of the color image is not used in generating the substantially gray scale image.

26. The imaging device of claim 24, wherein the processing circuit determines the plurality of parameters from statistical data of the plurality of color channels.

27. The imaging device of claim 23, wherein the plurality of color channels comprises a first color channel and a second color channel, wherein the plurality of parameters include a first parameter and a second parameter, wherein weights for the first and second channels are reverse proportional to values of the first and second parameters, and wherein the first and second parameters indicate overall color of the first and second channels of the color image.

28. The imaging device of claim 23, wherein, to generate the substantially gray scale image, the processing circuit is configured to:
nonlinearly scale luminance levels to stretch a range of luminance levels; and
reduce luminance levels for a boundary region of the substantially gray scale image based on a distance to a boundary.

29. The imaging device of claim 28, wherein, to generate the substantially gray scale image, the processing circuit is further configured to:
adjust color balance reverse proportional to luminance level.

30. An image device, comprising:
an image sensor to generate color values of a color image;
a processing circuit coupled to the image sensor, the processing circuit configured to:
receive a plurality of settings via a user interface for image conversion to convert the color image to a substantially gray scale image, the settings configuring the image conversion by selecting one or more statistical measures from a set of predetermined statistical measures, the color image having a plurality of color channels, each statistical measure applicable for generating statistical data from each color channel of the color image,
evaluate the selected statistical measures for each color channel to determine a plurality of parameters from the color image for converting pixels of the color image to pixels of the substantially gray scale image, each parameter corresponding to statistical data generated via one of the selected statistical measures of one color channel of the color image, at least one of the plurality of parameters corresponding to a statistical data of the color image, wherein the plurality of parameters for converting the pixels of the color image are independent of locations of the pixels in the color image,
automatically determine weights for the plurality of color channels of the color image based on the plurality of parameters, each weight depending on a subset of the plurality of parameters; and
generate the pixels of the substantially gray scale image from weighted color values of the color image according to the weights, each weight having a non-zero value, wherein one of the weights for the plurality of color channels is substantially smaller compared with a remainder of the weights of the plurality of color channels.

31. The imaging device of claim 30, wherein the color image comprises a frame of a video stream in a video conference; and, the substantially gray scale image is generated in real time for the video conference.

32. The imaging device of claim 30, wherein the processing circuit comprises an Application Specific Integrated Circuit.

33. The imaging device of claim 30, wherein the processing circuit comprises one of: a microcontroller and a microprocessor.

34. The imaging device of claim 30, wherein the plurality of color channels include Red and Green; and wherein the one of the weights corresponds to Blue channel of the image in generating the substantially gray scale image.

35. The imaging device of claim 34, wherein the processing circuit is configured to determine the statistical data from data of the plurality of color channels of the color image.

36. The imaging device of claim 30, wherein the statistical data comprises at least one of:
an average of color values of one of the plurality of color channels of the color image; and
a count of pixels with larger color values of a first color channel of the color image than color values of a second color channel of the color image.

37. The imaging device of claim 30, wherein to generate the substantially gray scale image the processing circuit is configured to:
determine gray levels from color values of the plurality of color channels according to the weights;
scale the gray levels to enhance contrast;
reduce the gray levels for a boundary region of the substantially gray scale image based on a distance to a boundary; and
determine color values of the substantially gray scale image according to the gray levels.

38. A method of image conversion, the method comprising:
receiving a plurality of settings via a user interface for the image conversion to convert a color image to a substantially gray scale image, the settings configuring the image conversion by selecting one or more statistical measures from a set of predetermined statistical measures, the color image having a plurality of color channels, each statistical measure applicable for generating statistical data from each color channel of the color image;
evaluating the selected statistical measures for each color channel to determine a plurality of parameters from the color image for converting pixels of the color image to pixels of the substantially gray scale image, each parameter corresponding to one of the selected statistical measures of one color channel of the color image, wherein the plurality of parameters for converting the pixels of the color image are independent of locations of the pixels in the color image;
determining weights for the plurality of color channels of the color image based on the determined parameters, each weight depending on a subset of the plurality of parameters; and
automatically generating the pixels of the substantially gray scale image using weighted color values of the color image according to the weights of the plurality of color channels of the color image.

39. The method of claim 38, wherein each weight has a non zero value, wherein one of the weights of the plurality of color channels of the color image is substantially smaller compared with a remainder of the weights of the plurality of color channels in generating the substantially gray scale image and wherein color channel corresponding to the one of the weights is Blue.

40. The method of claim 38, wherein for the plurality of parameters are determined from statistical data of the plurality of color channels.

41. The method of claim 38, wherein the plurality of color channels comprises a first color channel and a second color channel, wherein the plurality of parameters include a first parameter and a second parameter, wherein weights for the first and second channels are reverse proportional to the first and second parameters, and wherein the first and second parameters indicate overall color of the first and second channels of the color image.

42. The method of claim 41, wherein the first and second parameters are determined based on at least one of:
   an average color value of the first color channel of the color image; and
   a count of pixels with larger color values of the first color channel of the color image than color values of the second color channel of the color image.

43. The method of claim 38, wherein said generating the substantially gray scale image comprises:
   scaling luminance levels to stretch a range of luminance levels;
   reducing luminance levels for a boundary region of the substantially gray scale image based on a distance to a boundary; and
   adjusting color balance according to luminance level.

44. A method of image conversion, the method comprising:
   receiving a plurality of settings via a user interface for image conversion to convert a color image to a substantially gray scale image, the settings configuring the image conversion by selecting one or more statistical measures from a set of predetermined statistical measures, the color image having a plurality of color channels, each statistical measure applicable for generating statistic data from each color channel of the color image;
   evaluating the selected statistical measures for each color channel to determine a plurality of parameters from the color image for converting pixels of the color image to pixels of a substantially gray scale image, each parameter corresponding to statistical data generated via one of the selected statistical measures of one color channel of the color image, at least one of the plurality of parameters corresponding to a statistical data of the color image,
   wherein the plurality of parameters for converting the pixels of the color image are independent of locations of the pixels in the color image;
   automatically determining weights for the plurality of color channels of a color image based on the determined parameters, each weight depending on a subset of the plurality of parameters; and
   generating the pixels of the substantially gray scale image from weighted color values of the color image according to the weights, each weight having a non-zero value, wherein one of the weights for the plurality of color channels is substantially smaller compared with a remainder of the weights of the plurality of color channels.

45. The method of claim 44, wherein the plurality of color channels include Red and Green; and wherein the one of the weights corresponds to Blue channel of the image in generating the substantially gray scale image.

46. The method of claim 44, wherein a ratio between a weight for a first one of the plurality of color channels of the color image and a weight for a second one of the plurality of color channels of the color image is reverse proportional to a ratio between an average of color values of the first one of the plurality of color channels of the color image and an average of color values of the second one of the plurality of color channels of the color image.

47. The method of claim 44, wherein a ratio between a weight for a first one of the plurality of color channels of the color image and a weight for a second one of the plurality of color channels of the color image is reverse proportional to a ratio between a count of pixels with larger color values of the first one of the plurality of color channels of the color image than color values of the second one of the plurality of color channels of the color image and a count of pixels with larger color values of the second one of the plurality of color channels of the color image than color values of the first one of the plurality of color channels of the color image.

48. A data processing system for image conversion, the data processing system comprising:
   means for receiving a plurality of settings via a user interface for the image conversion to convert a color image to a substantially gray scale image, the settings configuring the image conversion by selecting one or more statistical measures from a set of predetermined statistical measures according to the configuration, the color image having a plurality of color channels, each statistical measure applicable for generating statistical data from each color channel of the color image;
   means for evaluating the selected statistical measures for each color channel to determine a plurality of parameters from the color image for converting pixels of the color image to pixels of the substantially gray scale image, each parameter corresponding to statistical data generated via one of the selected statistical measures of one color channel of the color image, wherein the plurality of parameters for converting the pixels of the color image are independent of locations of the pixels in the color image;
   means for determining weights for the plurality of color channels of the color image based on the determined parameters, each weight depending on a subset of the plurality of parameters; and
   means for generating the pixels of the substantially gray scale image using weighted color values of the color image according to the weights of the plurality of color channels.

49. The data processing system of claim 48, wherein each weight has a non zero value, wherein one of the weights of the plurality of color channels of the color image is substantially smaller compared with a remainder of the weights of the plurality of color channels in generating the substantially gray scale image and wherein color channel corresponding to the one of the weights is Blue.

50. The data processing system of claim 49, wherein data of a color channel of the color image is not used in generating the substantially gray scale image.

51. The data processing system of claim 48, wherein the plurality of color channels comprises a first color channel and a second color channel, wherein the plurality of parameters include a first parameter and a second parameter, wherein weights for the first and second channels are reverse proportional to the first and second parameters, and wherein the first and second parameters indicate overall color of the first and second channels of the color image.

52. The data processing system of claim 51, wherein the first and second parameters are determined based on:
- an average color value of the first color channel of the color image; and
- an average color value of the second color channel of the color image.

53. The data processing system of claim 51, wherein the first and second parameters are determined based on:
- a count of pixels with larger color values of the first color channel of the color image than color values of the second color channel of the color image; and
- a count of pixels with larger color values of the second color channel of the color image than color values of the first color channel of the color image.

54. The data processing system of claim 48, wherein said means for generating the substantially gray scale image comprises:
- means for adjusting color balance according to luminance level.

55. The data processing system of claim 54, wherein an amount of color balance shifting is reverse proportional to luminance level.

56. A data processing system for image conversion, the data processing system comprising:
- means for receiving a plurality of settings via a user interface for the image conversion to convert a color image to a substantially gray scale image, the settings configuring the image conversion by selecting one or more statistical measures from a set of predetermined statistical measures, the color image having a plurality of color channels, each statistical measure applicable for generating statistical data from each color channel of the color image;
- means for evaluating the selected statistical measures for each color channel to determine a plurality of parameters from the color image for converting pixels of the color image to pixels of the substantially gray scale image, each parameter corresponding to statistical data generated via one of the selected statistical measures of one color channel of the color image, at least one of the plurality of parameters corresponding to a statistical data of the color image, wherein the plurality of parameters for converting the pixels of the color image are independent of locations of the pixels in the color image;
- means for automatically determining weights for the plurality of color channels of a color image based on the parameters, each weight depending on a subset of the plurality of parameters; and
- means for generating the pixels of the substantially gray scale image from weighted color values of the color image according to the weights, each weight having a non-zero value, wherein one of the weights for the plurality of color channels is substantially smaller compared with a remainder of the weights of the plurality of color channels.

57. The data processing system of claim 56, wherein the plurality of color channels include Red and Green; and wherein the one of the plurality of weights corresponds to Blue channel of the image in generating the substantially gray scale image.

58. The data processing system of claim 57, wherein the means for the determination of the plurality of parameters comprises:
- means for determining the statistical data from data of the plurality of color channels of the color image.

59. The data processing system of claim 56, wherein said means for generating the substantially gray scale image comprises:
- means for determining gray levels from color values of the plurality of color channels according to the weights;
- means for scaling the gray levels to enhance contrast;
- means for reducing the gray levels for a boundary region of the substantially gray scale image based on a distance to a boundary; and
- means for determining color values of the substantially gray scale image according to the gray levels.

60. A non-transitory machine readable medium containing executable computer program instructions which when executed by a data processing system cause said system to perform a method of image conversion for data representation of a substantially gray scale image, the method comprising:
- receiving a plurality of settings via a user interface for the image conversion to convert a color image to the substantially gray scale image, the settings configuring the image conversion by selecting one or more statistical measures from a set of predetermined statistical measures, the color image having a plurality of color channels, each statistical measure applicable for generating statistical data from each color channel of the color image;
- evaluating the selected statistical measures for each color channel to determine a plurality of parameters from the color image for converting pixels of the color image to pixels of the substantially gray scale image, each parameter corresponding to statistical data generated via one of the selected statistical measures of one color channel of the color image, wherein the plurality of parameters for converting the pixels of the color image are independent of locations of the pixels in the color image;
- automatically determining weights for the plurality of color channels of the color image based on the determined parameters, each weight depending on a subset of the plurality of parameters;
- automatically determining one of a plurality of color channels of a color image; and
- generating the pixels of the substantially gray scale image using weighted color values of the color image according to the weights of the plurality of color channels, each weight having a non-zero value, wherein a weight of the determined one of the plurality of color channels for the weighted color values is substantially smaller compared with remaining weights of the plurality of color channels in generating the substantially gray scale image.

61. The medium of claim 60, further containing executable computer program instructions which when executed by a data processing system cause said system to display the substantially gray scale image.

62. The medium of claim 60, wherein, when the data representation of the substantially gray scale image is processed on the data processing system, the data representation of the substantially gray scale image causes the data processing system to display the substantially gray scale image.

63. The medium of claim 60, wherein the determined one of the plurality of color channels is Blue, for which the weight is substantially zero; and colors of the substantially gray scale image are a function of luminance level.

64. The medium of claim 60, wherein the plurality of color channels comprises a first color channel and a second color channel, wherein the plurality of parameters include a first parameter and a second parameter, wherein weights for the first and second channels are reverse proportional to the first and second parameters, and wherein the first and second parameters indicate overall color of the first and second channels of the color image.

65. The medium of claim 60, wherein the method further comprises:
   scaling nonlinearly luminance levels to stretch a range of luminance levels of the color image;
   reducing luminance levels for a boundary region of the substantially gray scale image based on a distance to a boundary; and
   adjusting color balance reverse proportionally to luminance level to generate the substantially gray scale image.

66. A machine readable medium containing executable computer program instructions which when executed by a data processing system cause said system to perform a method of image conversion for data representation of a substantially gray scale image obtained by a method of image conversion, the method comprising:
   receiving a plurality of settings via a user interface for the image conversion to convert a color image to the substantially gray scale image, the settings configuring the image conversion by selecting one or more statistical measures from a set of predetermined statistical measures, the color image having a plurality of color channels, each statistical measure applicable for generating statistical data from each color channel of the color image;
   evaluating the selected statistical measures for each color channel to determine a plurality of parameters from a color image for converting pixels of the color image to pixels of the substantially gray scale image, each parameter corresponding to statistical data generated via one of the selected statistical measures of one color channel of the color image, at least one of the plurality of parameters corresponding to a statistical data of the color image, wherein the plurality of parameters for converting the pixels of the color image are independent of locations of the pixels in the color image;
   automatically determining weights for the plurality of color channels of the color image based on the determined parameters, each weight depending on a subset of the plurality of parameters; and
   automatically generating the pixels of the substantially gray scale image from weighted color values of the plurality of color channels of the color image according to the weights determined for the plurality of color channels of the color image, each weight having a non-zero value, wherein a weight determined for one of the plurality of color channels for the weighted color values is substantially smaller compared with a remainder of the determined weights for the plurality of color channels.

67. The medium of claim 66, wherein the one of the plurality of color channels is Blue channel in generating the substantially gray scale image.

68. The medium of claim 67, wherein the determination of the plurality of parameters comprises:
   determining the statistical data from data of the plurality of color channels of the color image.

69. The medium of claim 66, wherein said generating the substantially gray scale image comprises:
   determining gray levels from color values of the plurality of color channels according to the weights;
   scaling the gray levels to enhance contrast; and
   determining color values of the substantially gray scale image according to the gray levels.

* * * * *